United States Patent [19]

Catano et al.

[11] 4,086,616
[45] Apr. 25, 1978

[54] ALL-WEATHER MULTI-SPECTRAL IMAGING SYSTEM

[75] Inventors: Paul S. Catano, San Diego; William E. Richards, El Cajon, both of Calif.

[73] Assignee: The United States of America as represented by the Secretary of the Navy, Washington, D.C.

[21] Appl. No.: 753,952

[22] Filed: Dec. 23, 1976

[51] Int. Cl.² .................................................. H04N 1/46
[52] U.S. Cl. ........................................ 358/81; 358/113
[58] Field of Search .................. 358/82, 81, 113, 211

[56] References Cited

U.S. PATENT DOCUMENTS

| 3,078,341 | 2/1963 | Willey | 358/81 |
|---|---|---|---|
| 3,742,124 | 6/1973 | Wilson et al. | 358/81 |
| 3,752,914 | 8/1973 | England et al. | 358/81 |
| 3,804,976 | 4/1974 | Gard | 358/113 |
| 3,806,633 | 4/1974 | Coleman | 358/81 |
| 3,812,288 | 5/1974 | Walsh et al. | 358/82 |

Primary Examiner—Richard Murray
Attorney, Agent, or Firm—R. S. Sciascia; G. J. Rubens; J. W. McLaren

[57] ABSTRACT

An all-weather, maximum resolution system visually presents a multi-color composite image of plural selected spectral ranges of energy received from a common field of view. First, second, and third images of a selected common field of view are developed and respective, first, second and third sensors (each responsive to a different spectral range of energy) develop first, second, and third sets of electrical signals commensurate with the energy emanating from the selected common field of view. In a typical preferred embodiment the selected spectral ranges may comprise the visual range of light energy, the middle infrared range comprising light energy in the 3 to 5 micron region, and the far infrared range comprising light energy in the 8 to 10 micron region. A multi-color cathode ray tube receives the three different sets of electrical signals thus developed and produces a multi-color composite image in three different primary colors representing the common field of view in the three discrete selected spectral ranges of energy which emanate from it. All-weather detection of objects within a field of view is then enabled such as during clear visibility, fog conditions, and rain conditions, in both daytime and nightime.

6 Claims, 3 Drawing Figures

ALL-WEATHER MULTI-SPECTRAL IMAGING SYSTEM

BACKGROUND OF THE INVENTION

In the present state of the art it is customary that each system designed to detect data information within a selectable field of view be provided with its own separate pointing apparatus as well as a discretely associated display means. This is generally true where spectrally distinct regions of the electromagnetic spectrum emanating from a common field of view may be sensed by different equipment systems. For example, a sensor such as a television camera may customarily be operatively employed with a discrete display monitor cathode ray tube for shipboard television systems which detect and display radiation within the visible region of the electromagnetic spectrum; there also may be separate sensors and display means in discrete equipment systems associated with other portions of the electromagnetic spectrum such as the near infrared, middle infrared, and far infrared. In addition to such passive systems, there may also be active systems, such as radar and sonar systems, which are separately operative to produce radar and sonar displays, respectively, though their surveillance may be directed to the same field of view as one or more other systems.

Such a plurality of discrete systems and multiplicity of separate displays, each associated with a different sensor, result in inefficiency and a lack of coordination of the signal information received. In such separate systems and display of signal information, one operator is confined to each display for continuous monitoring of the signal information presented. Thus, the present state of the art, not only results in inefficient usage of trained manpower, but also gives rise to a lack of precise field of view commonality between the plurality of spectrally distinct regions of the electromagnetic spectrum which may contain useful signal information; as a consequence there is a concomitant lack of registration of the several spectrally distinct regions of information which may be provided by a common field of view.

Moreover, in the present state of the art the several equipment systems which may be employed to develop signal information within spectrally distinct regions of the electromagnetic spectrum, each employs a separate, individually associated system pointing equipment. This results in an unnecessary complexity of multiple servomechanism controlled pointing systems which are very difficult to synchronize in operation to insure a precise common field of view such as would enable the coordinated interpretation of spectrally distinct regions of signal information emanating from a common field of view.

For example, it is common practice in the present state of the art to employ one servomechanism controlled system having a one or two axis gimbal which positions a television camera to sense electromagnetic radiation within the visible region, while additional separate servomechanism systems are operated separately under discrete control for imaging electromagnetic energy within several other spectrally distinct infrared regions.

Moreover, it is known that the same field of view will present detectable amounts of energy within spectrally distinct regions of the electromagnetic spectrum depending upon the prevailing conditions such as, for example, whether it is viewed under daytime or nightime conditions. Further, the spectrally distinct detectable amounts of energy within the same field of view will differ in accordance with the prevailing weather conditions, such as, for example, whether there is clear visibility or fog conditions, or rain conditions prevail. Thus, each of the two contrasting conditions of day and night may develop a multiplicity of compounded conditions such as clear weather, fog, or rain.

Within each or several of these various compounded conditions it is known that certain distinct spectral regions of the electromagnetic spectrum are markedly more penetrative and therefore particular spectral regions are more useful in detecting the presence of targets, for example, within a selected field of view in accordance with the prevailing weather conditions and also whether it is a daytime or a nightime operation.

Accordingly, it is highly desirable that a system be provided for developing a plurality of selected spectral ranges of energy received from a common field of view to provide maximum resolution and coordination of signal information under all weather conditions.

SUMMARY OF THE INVENTION

The present invention contemplates a system which can display data and signal information detected in a plurality of spectrally distinct imaging sensors sharing a single pointing system and a common field of view. For example, images developed from signal information in the visible, the middle infrared, and the far infrared spectral regions may be presented simultaneously in real time. Each sensor provides an image of the same field of view which is comprised of information spectrally distinct from the other sensors. Each of the three sensor outputs are employed to modulate one electron beam of a three-gun color television monitor producing images in three different primary colors, each representative of a discrete separate spectral region of the electromagnetic spectrum.

Accordingly, the present invention contemplates an optical means which is adapted to being controllably directed to receive energy from a desired field of view. First, second, and third means are synchronously operative and aligned with the optical means for producing first, second, and third images of the desired field of view.

A first sensor is aligned to receive the first image and may, for example, be responsive to energy components within a visible range for producing a first set of electrical signals commensurate with such visible range energy. Typically, a first sensor of this kind may comprise a television camera.

A second sensor is disposed and arranged to receive the second image and may be responsive to energy components of the second image within the middle infrared range, for example, from 3 to 5 microns wavelength for producing a second set of electrical signals commensurate with the detected energy within that range.

A third sensor is disposed and aligned to receive the third image and may be responsive to the energy components within the far infrared range of 8 to 14 microns wavelength for producing a third set of electrical signals commensurate with energy components in that particular spectral range.

A multi-color cathode ray tube, preferably of the three gun type, capable of producing three different primary colors, such as red, green, and blue, is connected to receive the first, second, and third sets of electrical signals for generating a multi-color composite image of the selected common field of view. Thus, the multiple discrete selected spectral ranges of energy detected within the common field of view are displayed compositely in a single multi-color monitoring image, with each of the colors representing a discrete spectral range of energy emanating from the common field of view.

Accordingly, the present system is capable of all-weather, maximum resolution operation providing the best available information as to a selected field of view under daytime and nightime conditions and also under varying weather conditions, including adverse weather conditions such as fog, and/or rain. Since certain of the spectral ranges may be detected more readily under each of the varying combinations of such conditions, the present invention provides a significantly broader capability of all-weather, maximum resolution performance as contrasted to prior art practices which were limited to their operative spectral range and composite visual presentation of spectrally discrete data.

It may therefore be appreciated that a primary object of the present invention is to provide an improved all-weather, maximum resolution system for visually presenting informationally coordinated, multi-color composite image of plural selected spectral ranges of energy received from a common field of view.

A most important object of the present invention is to provide such an all-weather, maximum resolution system which is operative in real-time and affords maximum versatility in discerning an image which may otherwise be obscured by adverse weather conditions.

Another important object of the present invention is to provide a composite image of plural selected spectral ranges of energy received from a common field of view through the use of a single pointing system which is controllably operative as desired from a single surveillance platform.

A further object of the present invention is to provide such an all-weather, maximum resolution system visually presenting a multi-color composite image of plural spectral ranges selected so that the direction of travel of an object within the field of view may be readily determined.

A further object of the present invention is to provide an all-weather, maximum resolution system visually presenting a multi-color composite image of plural spectral ranges of energy selected to provide target and decoy discrimination within a selectably determined field of view.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENT

Figure 1:
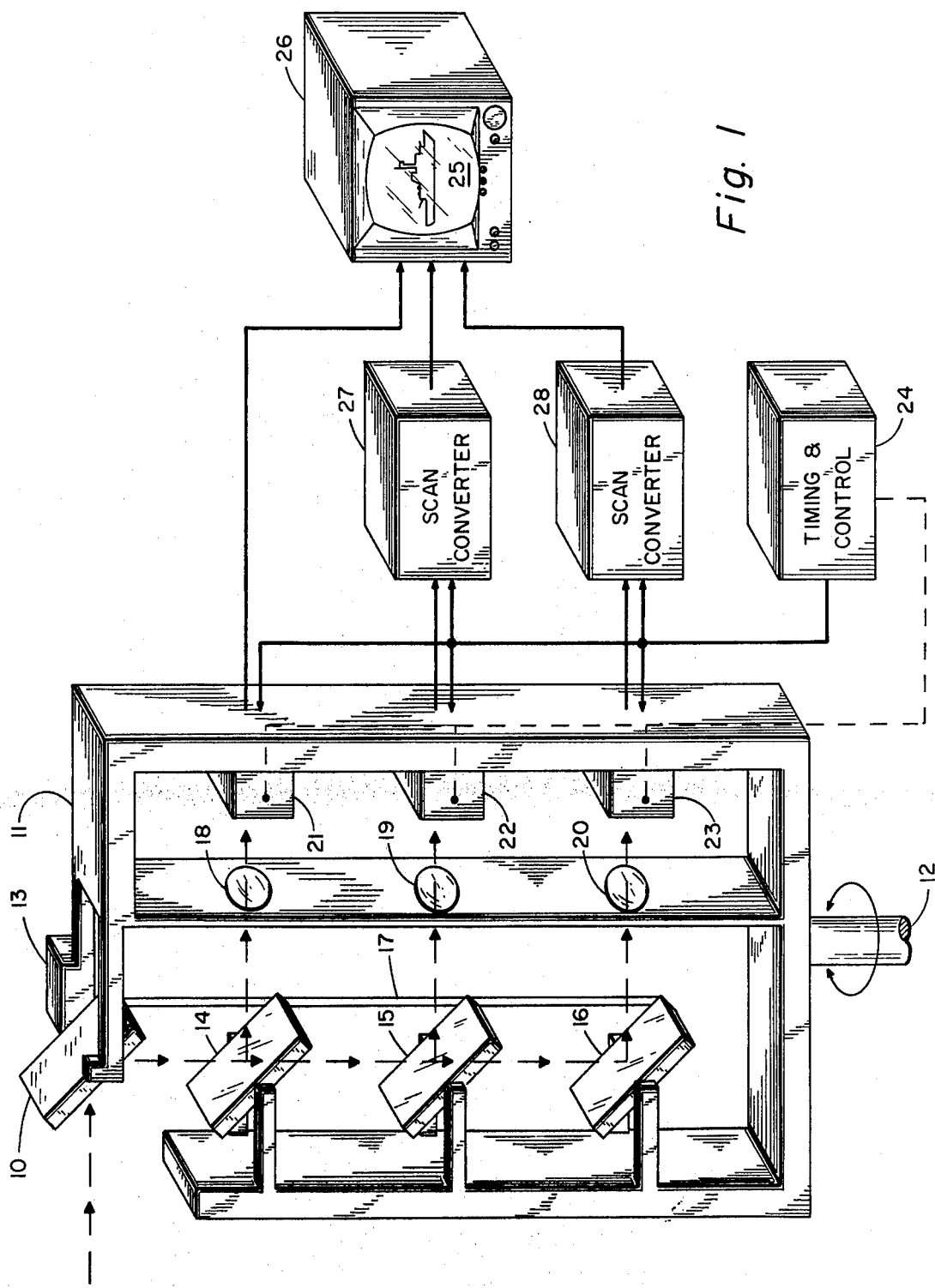
FIG. 1 is a schematic diagram of an embodiment of the present invention.

In FIG. 1 an optical means 10 such as a mirror, for example, is supported on a mount 11 which is arranged to be rotatably driven as indicated by the arrows at its lowermost support 12.

A drive means 13 which may comprise an electric motor, for example, is connected to the reflective optical means 10 so that it may be tilted as desired to change the elevation of the field of view. Thus, the optical means in the form of a reflective member 10 is adapted to be controllably directed in both elevation and azimuth to receive energy emanating from a desired field of view.

First, second, and third means 14, 15 and 16, respectively, are supported on the mount 11 so that they may be angularly positioned synchronously with optical means 10 through common linkage 17 to the drive means 13.

Thus, the first means 14, which may typically comprise a partially reflective element, is aligned with the optical means 10 to produce a first image of the desired field of view as contained in the energy reflected from its surface.

Similarly, the second means 15 is aligned with the optical means 10 for producing a second image of the desired field of view as contained in the energy which it reflects. The first and second means 14 and 15 may both comprise partially reflective optical elements.

A third means 16, which is synchronously operative with the optical means 10, is aligned and arranged for producing a third image of a desired field of view by reflecting that energy which is transmitted through both the first and second means 14 and 15, respectively.

Since the optical means 10 and the first, second and third means, 14, 15 and 16, are all articulated at the same angular disposition by reason of common connection through the linkage 17 to the drive means 13, as well as being driven in unison about the rotational axis 12, they are synchronously operative to produce first, second and third images of the same desired field of view.

The first, second, and third images thus produced may be suitably focused as necessary by suitable optical means such as lens at 18, 19 and 20 aligned with the first, second, and third images, respectively.

The first, second, and third images thus focused are received by first, second and third sensors, 21, 22 and 23, respectively. The first sensor 21 which receives the focused first image may be responsive to energy components of that first image within the visible range, for example, for producing a first set of electrical signals commensurate with such received energy. Typically, in a preferred embodiment of the present invention the first sensor may comprise a television camera responsive to substantially all elements of electromagnetic energy within the visible range.

The second sensor 22 receives the focused second image and may typically be responsive to the middle infrared range energy components for producing a second set of electrical signals commensurate with such received energy. Typically in a preferred embodiment of the present invention the second sensor may be responsive to electromagnetic energy components within the 3 to 5 micron wavelength range.

A third sensor 23 receives the third image and is responsive to energy components of the third image within the far infrared range for producing a third set of electrical signals commensurate with the received energy. In a preferred embodiment of the present invention such energy components may comprise the 8 to 14 micron wavelength range of electromagnetic energy.

In a preferred embodiment of the present invention the first and second sensors, 21 and 22, may comprise a currently available equipment such as the Dynarad System 210 which includes detection capabilities in the 3 to 5 micron wavelength range and the 8 to 14 micron wavelength range, as well.

First, second and third set of electrical signals thus developed from the plurality of selected spectral ranges of energy received from a common selected field of view are synchronized and controlled by suitable timing and control circuit 24 for real-time composite display. In a preferred embodiment of the present the visual display means may comprise a multi-color cathode ray tube 25 of a television monitor unit 26.

Since the first sensor 21 is a television camera in a preferred embodiment of the present invention for producing a first set of electrical signals commensurate with energy components of the selected desired image within the visible range, its output is compatible with the operation of television monitor 26. However, the outputs of the second and third sensors 22 and 23, respectively, may not necessarily be compatible with the television monitor 26 and may therefore require scan converters 27 and 28, respectively, which convert the signal format of the outputs of sensors 22 and 23 to the desired input format for the television monitor 26.

In a preferred embodiment of the present invention the television monitor 26 is capable of producing a composite image in three primary colors such as red, blue, and green. Those components of visible light energy approximately within the range of 0.4 to 1 microns wavelength may be displayed on the face of the cathode ray tube 25 by being connected to one of its three guns which produces a blue visual presentation.

The output of the second sensor 22 which produces a second set of electrical signals commensurate with middle infrared range energy components of the selected field of view (after undergoing such suitable scan conversion as may be necessary) is impressed upon a second gun of the multi-color cathode ray tube 25 to produce an image in the color green, representative of the detected signal energy within the 3 to 5 micron wavelength range.

The third set of electrical signals developed responsive to the energy components within the far infrared range of the selected field of view is connected to the third gun of the multi-color cathode ray tube 25 for producing an image in the color red, representative of energy components within the spectral range of 8 to 14 micron wavelength energy.

Thus, the composite visual presentation produced in accordance with the concept and teaching of the present invention is preferably produced in three different primary colors each associated with a separate wavelength spectral range of electromagnetic energy as, for example, in the foregoing described preferred embodiment of the present invention the visible, middle infrared, and far infrared ranges of energy received from a common field of view may be displayed on the face of the multi-color cathode ray tube 25 in blue, green, and red colors, respectively.

The importance of such composite display may be better appreciated in the context of the all-weather, maximum resolution operative characteristics of the present invention by an understanding of the different conditions under which it functions. For example, in clear weather daytime conditions the visible components of electromagnetic energy will produce a blue image on the face of the multicolor cathode ray tube 25. Under clear nightime conditions, however, the same field of view, such as may be produced by a vessel at sea, for example, will provide essentially a red image in the far infrared range on the face of the multi-color cathode ray tube 25.

By contrast, under conditions where fog prevails in the daytime, either the near or far infrared ranges of electromagnetic energy will penetrate the fog conditions much better than the visible components of electromagnetic energy and therefore produce a green, or yellow, or combination green and yellow visual presentation on the face of the multi-color cathode ray tube 25.

Under fog conditions at nightime the same operative characteristics prevail with the near and far infrared spectral components of electromagnetic energy penetrating predominately to produce the green or yellow, or combination green and yellow visual presentation on the face of the multi-color cathode ray tube 25.

By further contrast, during conditions of rain in the daytime the visible components of electromagnetic energy will predominate, providing an essentially blue visual presentation upon the face of the multi-color cathode ray tube 25. However, in rain conditions at nightime the near or far infrared spectral energy components of the electromagnetic energy will penetrate predominately to produce a green or yellow, or combination green and yellow visual presentation on the face of the multi-color cathode ray tube 25.

Figure 2:
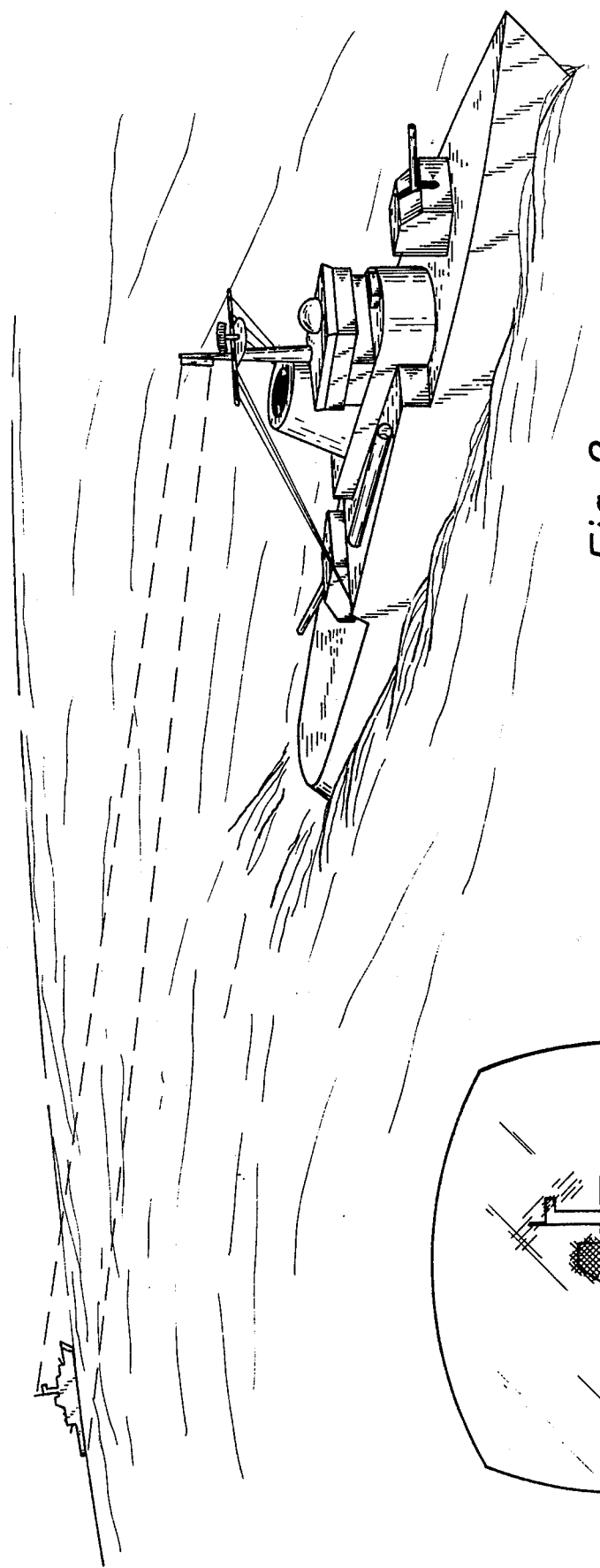
FIG. 2 is an illustration of a single surveillance platform mounted on a ship to be directed at a selected field of view.

FIG. 2 is a typical illustration of how an embodiment of the present invention, having a synchronously operative common support structure, may be mounted on a vessel at sea to be selectively directed at a desirable field of view such as the ship shown on the horizon, for example.

Figure 3:
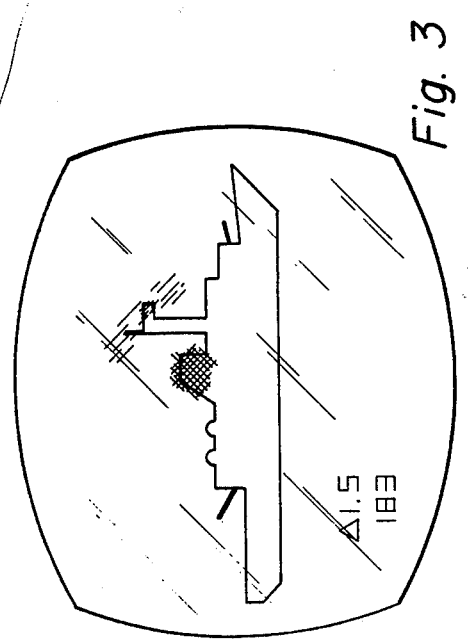
FIG. 3 is an illustration of a multi-color composite image visually presented by the present invention.

FIG. 3 is an enlarged illustration of the type of composite multi-color visual presentation which may be produced in accordance with the concept and teaching of the present invention. In FIG. 3 the ship outline may be essentially blue as in daytime conditions with clear weather visible components of the electromagnetic energy spectrum are readily detected. It should be noted, however, that during nightime or unfavorable weather conditions the near infrared energy components may be emanating principally from the mast structure of the vessel under surveillance as symbolically represented by the lined area of the illustration while the far infrared components symbolically represented by the cross-hatched area of the illustration may emanate principally from the stack of the vessel where considerable heat may be developed.

An important aspect of the present invention is the fact that it can be employed in surveillance functions to be directed at any desired field of view and provide highly useful and significant information not available from known prior art systems. When directed at a missile, for example, a preferred embodiment of the present invention is capable of providing information as to the direction of travel of the missile by reason of the different spectral components of energy which typically emanate from the nose of a missile as contrasted to those spectral components of electromagnetic energy emanating from its tail cone. With such a missile in its field of view, the present invention provides an image in the far infrared spectral region indicating energy emanating principally from the nose cone of the missile, while a separate, but target-related, spectral image visually presents both the middle and far infrared spectral components indicating the tail cone of the missile. Accordingly, the direction of travel of the missile is readily discernible by means of the multi-color composite visual display provided in accordance with the concept and teaching of the present invention.

Additionally, a preferred embodiment of the present invention may include the visual presentation of alpha-numeric information in the general manner illustrated in FIG. 3 such as range, azimuth, speed, etc. by the addition of input channels or time-sharing of the red, blue, or green channels described in the foregoing teachings.

As a further alternative, and/or addition, a cueing mode of operation may be implemented whereby one of the spectral channels is continuously displayed in its identifying color and selectively augmented by presentations of either or both of the other two spectral channels by selectively operative controls incorporated in the timing and control circuitry 24 shown in FIG. 1. An example of this type of alternative mode of operation may involve the visual presentation of signal information derived from a low-light-level television system together with one or more selected infrared spectral ranges of signal information derived from the same field of view.

Obviously many modifications and variations of the present invention are possible in the light of the above teachings. It is therefore to be understood that within the scope of the appended claims the invention may be practiced otherwise than as specifically described.

What is claimed is:

1. An all weather maximum resolution system for visually presenting a multi-color composite image of plural selected spectral ranges of energy received from a common field of view comprising:
   optical means controllably directed to receive energy from any desired field of view within 360° rotation in azimuth and substantially 90° in elevation;
   first, second, and third means synchronously operative and aligned with said optical meas for simultaneously producing first, second, and third images of said desired field of view;
   a first sensor responsive to energy components of sad first image within the visible range for producing a first set of electrical signals commensurate therewith;
   a second sensor responsive to energy components of said second image within the middle infrared range for producing a second set of electrical signals commensurate therewith;
   a thrid sensor responsive to energy components of said third image within the far infrared range for producing a third set of electrical signals commensurate therewith;
   a multi-color cathode ray tube for producing images in three different primary colors and connected to receive said first, second, and third sets of electrical signals for generating a multi-color composite image of said desired field of view in accordance with the multiple discrete selected spectral ranges of energy simultaneously detected in said field of view.

2. An all-weather maximum resolution system for visually presenting a multi-color composite image as claimed in claim 1 wherein the electrical signals developed from said first, second, and third sensors produce commensurate blue, green, and red images on the face of said multi-color cathode ray tube.

3. An all-weather maximum resolution system for visually presenting a multi-color composite image as claimed in claim 1 wherein one input channel to said multi-color cathode ray tube is time-shared for producing visual alpha-numeric symbolic information on the face of said tube simultaneously with said multi-color composite image.

4. An all-weather maximum resolution system for visually presenting a multi-color composite image as claimed in claim 1 including timing and control means for selectively cueing one or more of the electrical signals derived from said first, second, and third sensors for producing a continuously presented visual image augmented at selected times by different sensory information originating from the same field of view.

5. An all-weather maximum resolution system for visually presenting a multi-color composite image as claimed in claim 1 wherein said first sensor responsive to energy components within the visible range comprises a low-light-level television camera.

6. An all-weather maximum resolution system for visually presenting a multi-color composite image as claimed in claim 1 including scan converter means for adapting the format of signals produced by said sensors to a format compatible with cathode ray tube presentation.

* * * * *